Nov. 13, 1951  C. K. STROBEL  2,575,078
TEMPERATURE CONTROL SYSTEM FOR HEATING APPARATUS
Filed Nov. 5, 1947  2 SHEETS—SHEET 1

INVENTOR.
Charles K. Strobel.
BY
HIS ATTORNEY

Nov. 13, 1951 — C. K. STROBEL — 2,575,078
TEMPERATURE CONTROL SYSTEM FOR HEATING APPARATUS
Filed Nov. 5, 1947 — 2 SHEETS—SHEET 2

INVENTOR.
Charles K. Strobel.
BY
HIS ATTORNEY

tented Nov. 13, 1951

2,575,078

UNITED STATES PATENT OFFICE 2,575,078

TEMPERATURE CONTROL SYSTEM FOR HEATING APPARATUS

Charles K. Strobel, Pittsburgh, Pa., assignor to Robertshaw-Fulton Controls Company, Youngwood, Pa., a corporation of Delaware Application November 5, 1947, Serial No. 784,161

3 Claims. (Cl. 236—1)

This invention relates to temperature control systems and, more particularly, to electrical systems in employing thermally sensitive resistors for the control of temperature in ovens, rooms or other enclosures.

It has long been known that certain metallic oxide semi-conductors possess high negative temperature coefficients of resistance and will therefore decrease in resistivity with increase in temperature affecting the material. The temperature variation may be accomplished externally of the resistor by changes in ambient temperature or internally by the heating effect of current passing therethrough. Many different types of thermal resistors are available including discs or washers, rods and beads of nickel-manganese oxide, silver sulphide and other materials and usually mounted with electrodes and leads. The rod type is usually coated with glass or other electrical insulating material while the bead type is mounted in sealed glass bulbs. The devices remain stable in resistance value when hot or cold, the former being a valuable characteristic in the application herein described.

It is apparent, therefore, that a simple circuit employing thermal resistance means of the indicated nature would serve to eliminate the relatively bulky and expensive temperature control elements now universally employed, for example, in domestic gas and electric ranges. The rod-and-tube thermostat or the liquid-type employing a bulb, bellows and capillary element now largely in use require considerable skill and care in manufacture and occupy valuable space when installed in the range or oven. By comparison, the thermally sensitive resistors contemplated by this invention are of insignificant size and correspondingly uncomplicated and inexpensive to manufacture.

With these and other objects and advantages which will become apparent hereinafter, the invention consists in a novel arrangement of parts now to be described and which is illustrated in the accompanying drawings, wherein.

Figure 1:
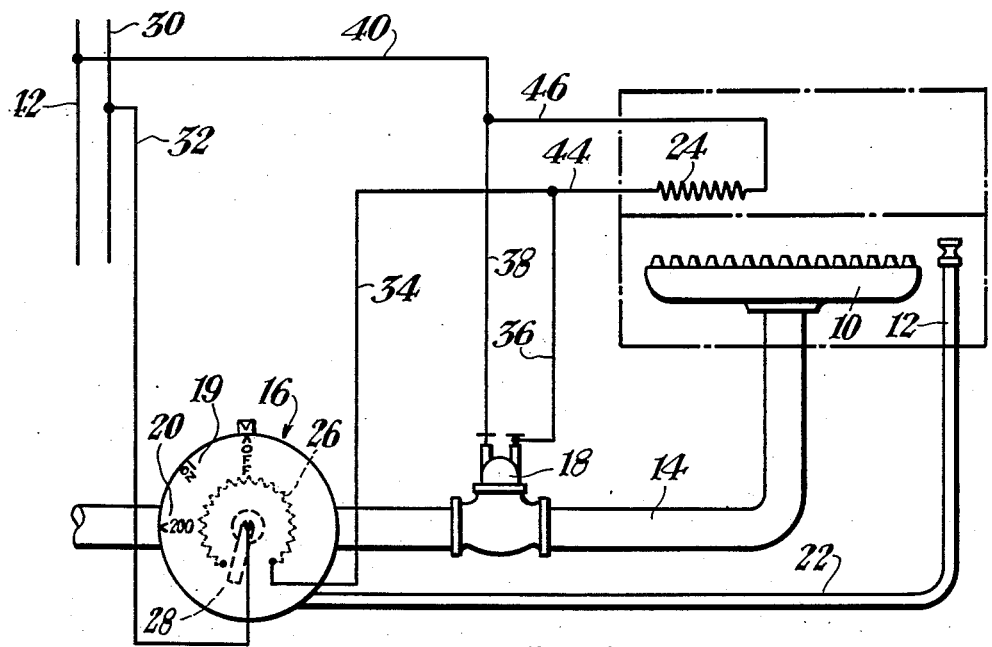
Fig. 1 is a schematic view of a temperature control system for a domestic gas oven embodying the invention.

Referring more particularly to the embodiment disclosed in Fig. 1 of the drawings, the temperature control system is applied to a domestic gas range having an oven indicated in broken lines in the drawing and containing a main burner 10 and a pilot burner 12 in lighting proximity thereto. The main burner 10 is supplied with fuel by a main fuel pipe 14 wherein the flow of fuel is under control of a main gas cock 16 and also of an electrically operable means in the form of an electromagnetic or solenoid valve 18 which is biased to a closed position.

The main valve 16 is manually operable between "off" and "on" positions as indicated on the usual handle or dial 19 by which the cock is rotated. In accordance with this invention the dial 19 also carries temperature indicia 20 for various settings corresponding to selected values of the oven temperature. Only one such temperature indicia 20 is indicated in the drawing as such dial markings are well known and further illustration is deemed unnecessary. The flow of fuel to the pilot burner 12 is also under control of the main valve 16 by the connection of one end of a conduit 22 to the pilot burner 12 and to the main valve 16 at the opposite end. It will be understood that a constant-burning pilot burner could be employed if desired by connecting the said opposite end of the conduit 22 to the main fuel pipe 14 ahead of the main valve 16.

The control circuit for the main burner 10 includes the thermal resistance means 24 of this invention and which is in the form of a semiconductive material having a high negative temperature coefficient of resistance for decreasing in resistivity in accordance with an increase in temperature ambient thereto. In this embodiment, the thermal resistance element 24 is located in the oven being heated by the main burner 10 and will, in conjunction with other elements to be described, control the temperature of the oven in accordance with a selected value on the dial 19.

A second thermal resistance means 26 is utilized in the control circuit to be described and takes the form of a rheostat or variable resistor of any known and suitable form. A movable arm 28 is cooperable with the resistance means 26 in a well-known manner to vary the resistivity setting over a desired range corresponding with the temperature indicia 20. As shown schematically in Fig. 1, the thermal resistance means 26 is located beneath the dial 19 to which the arm 28 is secured at one end for movement across the surface of the resistance means 26 in good electrical contact therewith. In the "off" position of the dial 19, that is, when the fuel cock is closed, the arm 28 is out of operative contact with the resistance means 26. The resistance means 26 may also be of the type having thermal resistance characteristics for a purpose to be apparent hereinafter and preferably has a positive temperature coefficient of resistance for increasing in resistivity in accordance with the passage of electric current therethrough.

The connection of the various electrically energized elements of the system in the control circuit will be described in connection with the operation of the system, which now ensues. Assuming that the oven is cold and both the main burner 10 and the pilot burner 12 are extinguished, the system is placed in operation by turning the dial 19 from the "off" position shown to a selected temperature setting shown by the indicia 20. During this operation, the arm 28 is rotated relative to the adjustable resistance means 26 a predetermined amount corresponding to the selected temperature of the oven. Consequently, the resistivity setting of the adjustable resistance means 26 is adjusted and will remain at such value as is predetermined by its temperature-current characteristics.

A circuit is now established which may be traced as follows: line wire 30, wire 32, movable arm 28, resistance means 26, wire 34, wire 36, coil of the solenoid valve 18, wire 38 and wire 40 back to line wire 42. The resistance means 24 is connected in parallel mesh circuit with the coil of solenoid valve 18 by wire 44 from one end of resistance means 24 to wire 34 and wire 46 from the opposite end of the resistance means 24 to wire 40. It will be observed that the adjustable resistance means 26 is in series circuit with the parallel mesh consisting of the coil of the solenoid valve 18 and the resistance means 24.

The resistance means 24 is unheated at this time and has a relatively high resistance so that sufficient current flows through the coil of the solenoid valve 18 to cause actuation of this valve against its bias to open position. Consequently, fuel is admitted to the main burner 10 and the pilot burner 12 and ignition of these burners can be conducted.

As the temperature in the oven increases, the resistance means 24 becomes heated accordingly and its resistance correspondingly decreases causing an increase in the circuit current and voltage drop across the adjustable resistance means 26. This increase in voltage drop is enhanced by the positive temperature coefficient of this element as will be apparent. The net result is that the voltage drop across the coil of the solenoid valve 18 is decreased and, at a definite temperature of the resistance means 24, the valve 18 closes to shut-off the supply of fuel to the main burner 10.

The system is of the recycling type as is necessary for temperature control in the oven. Thus, in the cooling cycle the action previously described is reversed and at a definite temperature of the resistance means 24 the supply of electric energy to the coil of the solenoid valve 18 is of sufficient value for operation of the valve 18 to open position. It is apparent, therefore, that the arrangement provides for maintaining the oven temperature in substantial accordance with the setting on the dial 19 throughout the operation of the oven.

In the relatively simple circuit disclosed in Fig. 1 of the drawings the solenoid valve 18 is operated directly by changes in resistivity of the resistance means 24 in cooperation with the resistance means 26. A reduction in the power consumption of the system could, of course, be obtained by the interposition of a relay device between the solenoid valve 18 and the resistance means 24. Such a relay-operated system lends itself particularly to the control of electric heating elements as is disclosed in the embodiment shown in Fig. 2. In this arrangement the temperature control system is applied to an electrically heated oven having electric resistance heating means 48 located therein. In this and succeeding embodiments, similar reference characters to those used in connection with Fig. 1 have been employed for similar parts. The resistance means 24 of this invention is positioned in the oven to respond to the temperature condition to be controlled by varying in resistivity in accordance with variations in the temperature. The energization of the heating means 48 is controlled by a relay 50 having a coil 52 and switching means in the form of an armature 54 operable thereby between open and closed positions relative to a fixed contact 56. Thus, upon variation in the energy value supplied to the coil 52 the armature 54 will be moved relative to contact 56 between its biased or released position and its attracted or contact closed position.

Manually operable control means 58 for controlling the flow of energy in the system include the handle or dial 19 carrying the "off" and "on" markings and the temperature indicia 20. The adjustable resistance means 26 is cooperable with a movable arm 60 carried by the handle 19 to establish the resistivity settings of the adjustable resistance means 26 over the predetermined range corresponding to selected oven temperatures. In the "off" position of the handle 19 the movable arm 60 occupies a position intermediate opposite ends of the adjustable resistance means 26 as indicated in Fig. 2 of the drawings.

In order that one side of the line to the relay coil circuit may be broken in this "off" position of the dial 19, suitable switching means are provided for cooperation with the movable arm 60. Such switching means takes the form of an ordinary snap-switch device 62 having the operating button 64 thereof engageable by the movable arm 60 in its movement between the "off" and "on" positions of the handle 19. Thus, in the "off" position of the dial 19 the snap-switch 62 will also be in "off" position but will be operated to an "on" position when the dial 19 is rotated toward the "on" position thereof.

As indicated, the snap-switch arrangement will serve to open one side of the line circuit to the control circuit but the circuit of the heating means 48 is opened only by the positioning of the arm 60 in the "off" position of the dial 19. Consequently, it will be apparent that the other side of this line circuit could also be opened simultaneously if desired by the provision of a second switching means similar to the snap switch 62 at the appropriate location. On the other hand, if it is desirable to open only one side of the line for all circuits in the "off" position of the handle 19, then the snap-switch 62 could be dispensed with and the deenergization effected by the mere positioning of the movable arm 60 in "off" position relative to the adjustable resistance means 26 as in the Fig. 1 embodiment.

Figure 2:
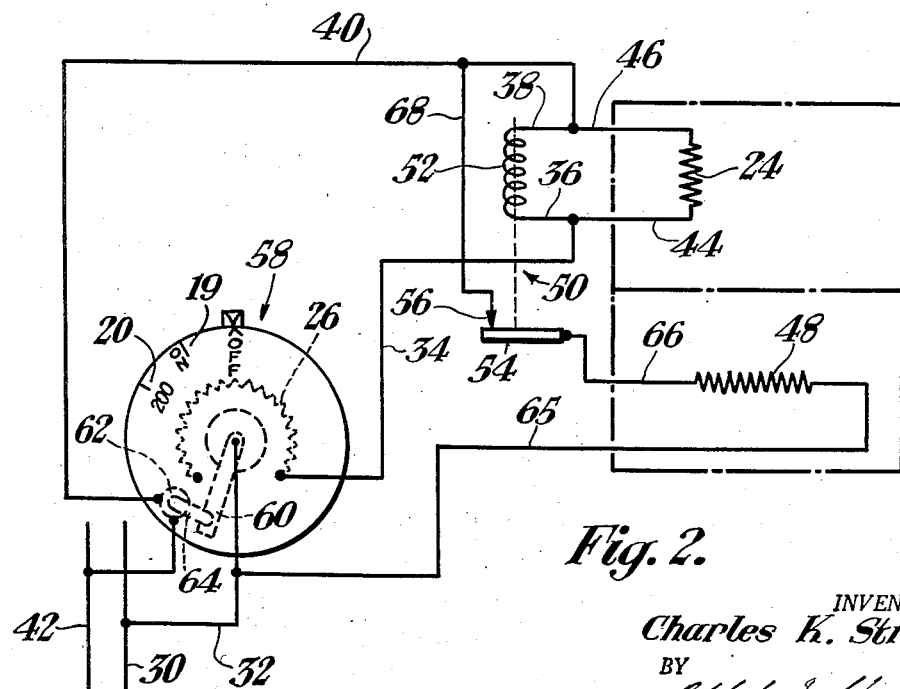
Fig. 2 is a similar schematic view of a temperature control system for a domestic electric oven embodying the invention.

In the operation of the system shown in Fig. 2 the rotation of the dial 19 from the "off" position, as shown, to a selected temperature setting will serve to position the movable arm 60 relative to the adjustable resistance means 26 and set the latter at the predetermined value. This operation will also serve to move the snap-switch 62 to its closed position. A circuit is then established for the relay 50 which may be traced as follows: line wire 30, wire 32, movable arm 60, adjustable resistance means 26, wire 34, wire 36, relay coil 52, wire 38 and wire 40 through snap-switch 62 to the other line wire 42. The thermal resistance means 24 is connected in parallel mesh circuit with the relay coil 52 by wire 46 from one end of resistance means 24 to wire 40 and by wire 44 from the opposite end of resistance means 24 to wire 34.

Hence, the thermal resistance means 24 which is located in the unheated oven and has a relatively high resistance when cold will permit sufficient current flow through the coil 52 to cause movement of the armature 54 into attracted relation relative to the contact 56. A circuit for the heating element 48 is then established and may be traced as follows: line wire 30, wire 32, wire 65, heating element 48, wire 66, armature 54, contact 56, wire 68 and wire 40 through snap-switch 62 to the other line wire 42. It will be observed that the circuit for the heating element 48 and relay armature 54 is in parallel with the series circuit of the adjustable resistance means 26 and the parallel mesh of thermal resistance means 24 and relay coil 52.

The energization of the heating means 48 now occurs and the temperature of the oven consequently increases. When the temperature setting of the handle 19 is reached the thermal resistance means 24 is sufficiently heated and its resistance decreases causing an increase in the circuit current and voltage drop across the adjustable resistance means 26. The increase in voltage drop across the adjustable resistance means 26 is augmented by the positive temperature coefficient of this element. Consequently, the voltage drop across the coil 52 is decreased and the armature 54 is released to open the circuit of the heating means 48. Upon cooling of the oven, the described action is reversed and as the temperature sensed by the thermal resistance means 24 is below the corresponding setting of the handle 19, the relay coil 52 is sufficiently energized to attract the armature 54 to begin another heating cycle.

Figure 3:
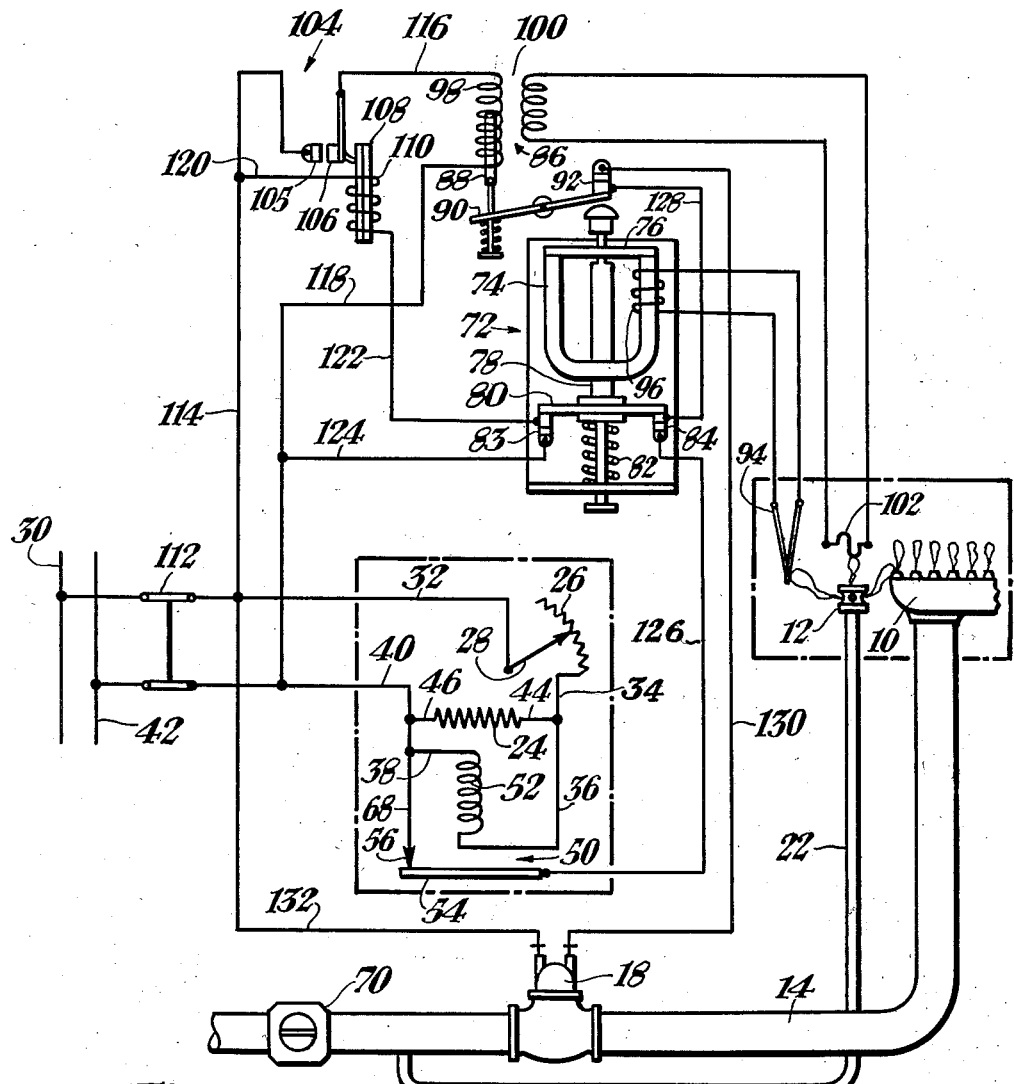
Fig. 3 is a schematic view of the temperature control system for central heating apparatus embodying the invention.

In the embodiment disclosed in Fig. 3 of the drawings, the temperature control system is shown applied to a space-heating arrangement of the general type disclosed in United States patent to Strobel No. 2,406,925 dated September 3, 1946. In the patented arrangement, a single electromagnetic valve is used for condition and safety control in conjunction with a gaseous fuel burner. The safety control is effected by placing the electromagnetic valve under control of a thermoelectric device responsive to a flame at the pilot burner. The condition control for the electromagnetic valve in the patented arrangement takes the form of a room thermostat operated through a bimetallic spiral of conventional type. The present invention is more particularly directed to an improved form of condition control for the disclosed system and, accordingly, only brief reference will be made to the parts fully described and shown in the aforementioned patent.

A main fuel burner 10 is supplied with gaseous fuel by the main fuel pipe 14 in which a main fuel shut-off cock 70 is provided. The flow of fuel in the pipe 14 is also under the control of the electromagnetic valve 18 which is biased to closed position. The conduit 22 for supplying fuel to the pilot burner 12 is conected to the main fuel pipe 14 between the shut-off cock 70 and the electromagnetic valve 18. The safety control for the electromagnetic valve 18 comprises electrically operated control means 72 of electromagnetic form. The control means 72 comprises a horseshoe magnet 74 and armature 76 loosely mounted on a stem 78. A contact bar 80 is mounted on the stem 78 and is biased to a released position together with the armature 76 by the coil spring 82. In the released position of the contact bar 80 fixed contact pairs 83, 84 associated with the bar 80 are disengaged.

The electromagnetic device 72 is resettable by a second electrically operable means 86 of electromagnetic form. The resetting means comprises a magnet plunger 88 for operating a pivoted lever 90 carrying a third pair of switch contacts 92 associated with the electromagnetic device 72. The arrangement is such that upon attraction of the magnet plunger 88 the lever 90 will be rotated on its pivot causing disengagement of the contact pair 92, resetting of the armature 76 and closing of the contact pairs 83, 84.

Thermoelectric means in the form of a thermocouple 94 is connected to a winding 96 for the horseshoe magnet 74. The thermocouple 94 is exposed to a flame at the pilot burner 12 and will generate sufficient energy to retain the armature 76 in attracted position after it has been reset by the resetting means 86. The operating coil 98 for the magnet plunger 88 takes the form of a primary coil of a transformer 100. The secondary of transformer 100 is connected to electric igniting means 102 for the pilot burner 12. The flow of energy to the primary 98 is controlled by a thermal switch 104 having normally closed contacts 105, 106 and a bimetallic operating arm 108 having a heater coil 110 associated therewith.

The foregoing description includes the essential parts of the patented arrangement which correspond to the parts disclosed herein. As previously indicated, the condition control for the system is different from that disclosed in the patent. The novel condition control device of this invention is located in a space in which the temperature is to be controlled, such as a room, and embodies parts similar to those described in connection with the Figs. 1 and 2 embodiments of this invention.

The condition control may be mounted in a casing as indicated in broken lines in the drawing and which is mounted on the wall or other appropriate location in the space in which the temperature is to be controlled. The resistance means 24 and adjustable resistance means 26 are contained within the casing and the movable arm 28 is arranged for adjustment from the exterior thereof. The arrangement also includes the relay 50 having the coil 52 and armature 54 cooperable with the fixed contact 56. The relay 50 is adapted to control operation of the solenoid valve 18 and, thus, the flow of fuel to the main burner 10. As in previous instances, the circuit connections will be described as the following description of the operation proceeds.

In the operation of the arrangement disclosed in Fig. 3, the main burner 10 is brought to the operating condition shown by closure of a double-pole main switch 112 when the movable arm 28 is set at a desired temperature setting on the indicia (not shown) and when the main fuel cock 70 is rotated to open position. Fuel is supplied to the pilot burner 12 at this time but the main burner 10 does not receive fuel due to the solenoid valve 18 being still closed. A circuit for the resetting device 86 is now established as follows: line wire 30, one pole of main switch 112, wire 114, contacts 105, 106, wire 116, winding 98 and wire 118 through the other pole of main switch 112 to line wire 42. The magnet plunger 88 is attracted and at the same time the igniter 102 is energized through the secondary of the transformer 100. Consequently, fuel flowing from the pilot burner 12 is ignited and the thermocouple 94 commences to become heated.

Owing to attraction of the magnet plunger 88 the electromagnetic device 72 is reset, the contact pair 92 is opened, and a circuit for the heater coil 110 is established as follows: line wire 30, one pole of main switch 112, wire 114, wire 120, winding 110, wire 122, contact pair 83, wire 124 and wire 118 through the other pole of main switch 112 to line wire 42. After a predetermined period, the bimetal arm 108 warps to open the normally closed contact pair 105, 106. Thus, the winding 98 for the magnet plunger 88 is deenergized for the duration of the running period. As the lever 90 is then rotated counterclockwise by dropping of the magnet plunger 88, the third contact pair 92 is closed and a circuit for the solenoid valve 18 is established providing, however, that the relay 50 is operative to maintain the armature 54 in engagement with the fixed contact 56 thereof. This would be the case in the event that the room temperature is below the setting of the movable arm 28 and the resistance means 24 is consequently of normal high resistance. The circuit of the relay coil 52 has been established as soon as the main switch 112 was closed, as follows: line wire 30, one pole of main switch 112, wire 32, arm 28, resistance means 26, wire 34, wire 36, coil 52, wire 38, and wire 40 through the other pole of main switch 112 to line wire 42. The thermal resistance means 24 is connected in parallel mesh circuit with the relay coil 52 by wire 46 from one end of resistance means 24 to wire 40 and by wire 44 from the opposite end of resistance means 24 to wire 34.

Under such conditions the circuit for the solenoid valve 18 may be traced as follows: line wire 42 to one pole of switch 112, wire 40, wire 68, contact 56, relay armature 54, wire 126, contact pair 84, wire 128, contact pair 92, wire 130, coil of solenoid valve 18 and wire 132 through the other pole of main switch 112 to line wire 30.

The fuel flowing to the main burner 10 due to opening of the solenoid valve 18 will be ignited by the flame at the pilot burner 12. The temperature in the space where the resistance means 24 is located will thus increase until the temperature corresponding to the setting of the adjustable resistance means 26 is reached. The resistivity of the resistance means 24 will then decrease sufficiently to cause an increase in the voltage drop across the adjustable resistance means 26 and a consequent decrease in voltage drop across the relay coil 52. Thus, at a definite temperature of the resistance means 24, the armature 54 is released to open the circuit of the solenoid valve 18 and shut-off the flow of fuel to the main burner 10.

The system will recycle when the relay coil 52 is again energized sufficiently to attract the armature 54 upon cooling of the space where the thermal resistance means 24 is located. The device thus operates as a room thermostat to control the main burner 10 as long as the pilot burner 12 is producing a flame. As in the aforementioned patent, the extinguishment of the pilot burner flame will cause cooling of the thermocouple 94 and deenergization of the winding 96. The opening of the contact pairs 83, 84 by consequent release of the armature 76 serves to open the circuit of the solenoid valve 18 and the heater coil 110. However, the contacts 105, 106 do not close until after a purge period, the length of which is determined by the time required by the bimetal 108 to cool.

Figure 4:
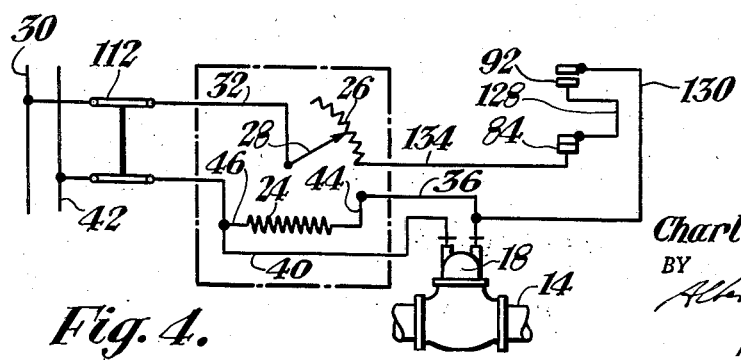
Fig. 4 is a schematic view of a modification of part of the system shown in Fig. 3.

It will be apparent that the relay 50 disclosed in the Fig. 3 embodiment could be dispensed with and the solenoid valve 18 controlled directly by the action of the thermal resistance means 24 as in the embodiment disclosed in Fig. 1. Thus, referring now more particularly to Fig. 4, a portion of the control syetem disclosed in Fig. 3 is illustrated in order to clarify the alternative arrangement. Thus, the alternative circuit for the solenoid valve 18 may be traced as follows: from the line wire 30, one pole of main switch 112, wire 32, movable arm 28, adjustable resistance means 26, wire 134, contact pair 84, wire 128, contact pair 92, wire 130, coil of solenoid valve 18 and wire 40 through the other pole of main switch 112 to line wire 42.

The resistance means 24 is connected in parallel mesh circuit with the coil of the solenoid valve 18 by wire 44 connected at one end to wire 36 and at the opposite ends to one end of resistance means 24 and by wire 46 connected at one end to wire 40 and at the opposite end to the other end of the resistance means 24. The arrangement is thus somewhat similar to the Fig. 1 embodiment inasmuch as the adjustable resistance means 26 is connected in series circuit with the parallel mesh of resistance means 24 and the coil of the solenoid valve 18. As the operation of the embodiment disclosed in Fig. 4 will be clear from the description of the Fig. 3 and other embodiments, it will not be repeated.

It will be understood that many changes may be made in the details of construction and arrangement of parts without departing from the present invention so that this description and accompanying drawings are intended by way of illustration only and are not to be construed in a limiting sense.

I claim:

1. A control system for fuel burners having main and pilot burners, comprising in combination, electrically operable means movable between operative positions for controlling the supply of fuel to the main burner, thermomagnetic switch means responsive to a flame at the pilot burner and operable to a first position for causing operation of said electrically operable means to one of said positions, and to a second position for causing operation thereof to another said position, means for resetting said thermomagnetic switch means in said first position including second electrically operable means, means responsive to movement of said thermomagnetic switch means to said first position for causing deenergization of said second electrically operable means, thermal resistance means located to respond to a temperature condition to be controlled by varying in resistivity in accordance with variations in said condition and being electrically connected to said first electrically operable means, and resistance means electrically connected to said thermal resistance means and being adjustable over a range of resistivity settings corresponding to selected values of said condition, the arrangement being such that at a predetermined resistivity of said thermal resistance means the energy value supplied to said electrically operable means is varied sufficiently for operation thereof between said positions.

2. A control system for fuel burners having main and pilot burners, comprising in combination, electromagnetic valve means movable between open and closed positions for controlling the supply of fuel to the main burner, thermomagnetic switch means in series circuit with said electromagnetic valve means and responsive to a flame at the pilot burner for opening said circuit in the absence of said flame, means for resetting said thermomagnetic switch means for closing said circuit including a relay having a coil and an armature mechanically connected to said thermomagnetic switch means for operating the same, means for opening the circuit of said relay coil upon said circuit closing operation of said thermomagnetic switch means, a second relay having a coil and an armature connected for opening and closing said circuit independently of said thermomagnetic switch means, first resistance means located to be heated in a space in which the temperature is to be controlled and by varying in resistivity in accordance with variations in said temperature and being connected in parallel mesh circuit with said second relay coil, and second resistance means connected in series circuit with said mesh and being adjustable over a range of resistivity settings corresponding to selected values of said temperature, said first and second resistance means being cooperable for causing energy of sufficient value to be supplied to said second relay coil when said first resistance means is unheated for operation of said second relay armature for closing said circuit and causing operation of said valve means to open position, and for reducing said energy below said sufficient value for operation of said second relay armature for opening said circuit and causing operation of said valve means to closed position when said first resistance means is heated at substantially the selected temperature of said space.

3. A control system for fuel burners having main and pilot burners, comprising in combination, electromagnetic valve means movable between open and closed positions for controlling the fuel supply to the main burner, thermomagnetic switch means in series circuit with said electromagnetic valve means and responsive to a flame at the pilot burner for opening said circuit in the absence of said flame, means for resetting said thermomagnetic switch means for closing said circuit including a relay having a coil and an armature mechanically connected to said thermomagnetic switch means for operating the same, means for opening the circuit of said relay coil upon said circuit closing operation of said thermomagnetic switch means, first resistance means located to be heated in a space in which the temperature is to be controlled and by varying in resistivity in accordance with variations in said temperature and being connected in parallel mesh circuit with said electromagnetic valve means, and second resistance means connected in series circuit with said mesh and being adjustable over a range of resistivity settings corresponding to selected values of said temperature, said first and second resistance means being cooperable for causing energy of sufficient value to be supplied to said electromagnetic valve means when said first resistance means is unheated for causing operation to open position, and for reducing said energy below said sufficient value for operation of said electromagnetic valve means to closed position when said first resistance means is heated at substantially the selected temperature of said space.

CHARLES K. STROBEL.

REFERENCES CITED

The following references are of record in the file of this patent:

UNITED STATES PATENTS

| Number | Name | Date |
| --- | --- | --- |
| 1,528,053 | Hands | Mar. 3, 1925 |
| 2,406,925 | Strobel | Sept. 3, 1946 |
| 2,487,556 | Jenkins | Nov. 8, 1949 |
| 2,545,353 | Gund | Mar. 13, 1951 |

FOREIGN PATENTS

| Number | Country | Date |
| --- | --- | --- |
| 557,707 | Great Britain | Dec. 1, 1943 |